Patented Dec. 24, 1935

2,025,211

UNITED STATES PATENT OFFICE 2,025,211

AZO DYESTUFFS AND PROCESS OF MAKING THE SAME

Arthur Howard Knight, Ashton-on-Mersey, England, assignor to Imperial Chemical Industries Limited, a corporation of Great Britain No Drawing. Application November 15, 1933, Serial No. 698,222. In Great Britain November 17, 1932

13 Claims. (Cl. 260—83)

The present invention relates to the manufacture of new azo dyestuffs.

According to this invention I treat 1-amino-5-naphthol with ethylene chlorohydrin in an aqueous solution containing a mild alkali (such as calcium carbonate, sodium carbonate, potassium carbonate, trisodium phosphate, sodium acetate), and I thus obtain the hitherto unknown 1,β-hydroxyethylamino-5-naphthol in good yield. This compound has the formula:

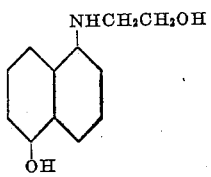

I then couple the so-obtained 1-β-hydroxyethylamino-5-naphthol with suitable diazo compounds in acid or alkaline medium.

The invention is particularly directed to the production of new and valuable disazo dyestuffs for acetylcellulose or other cellulose esters or cellulose ethers. For instance, I may combine the new 1,β-hydroxyethylamino-5-naphthol in an acid medium with a diazotized amino-azo compound obtained by coupling a diazotized aniline or naphthylamine or homologue or halogeno- or alkoxy-derivative thereof with a 2,5-dialkoxy-aniline (compare my co-pending application Serial Number 635,860 which has matured into U. S. Patent No. 1,976,609) and thus obtain blue to black dyestuffs having excellent affinity for acetylcellulose and giving thereon clear shades of good fastness to light and excellent dischargeability.

The invention is illustrated but not limited, by the following examples in which the parts are by weight.

Example 1

31.8 parts of 1-amino-5-naphthol, 10.5 parts of chalk (calcium carbonate), 51 parts of aqueous ethylene-chlorohydrin of 33.5% strength, 50 parts of methylated spirits are mixed and boiled for 5 hours under a reflux condenser. A nearly clear solution is formed but on cooling the desired product crystallizes. It is filtered off, washed and dried. The new product is a greyish powder.

Example 2

The product of Example 1 is obtained in purer form and more expeditiously by operating as follows:—

31.8 parts of 1-amino-5-naphthol, 30 parts of chalk, and 240 parts of aqueous ethylene-chlorohydrin of 33.5% strength are boiled together for 2½ hours. By so using a considerable excess of ethylene-chlorohydrin and by suitably adjusting the reaction time a product free from unchanged aminonaphthol is obtained. The reaction mixture is filtered whilst still hot, and deposits an oily layer which crystallizes on cooling. The crystals are removed and are almost pure 1-β-hydroxyethylamino-5-naphthol of formula

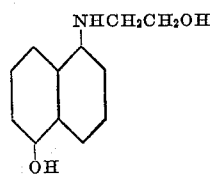

The compound is easily crystallized from aqueous alcohol. It then forms almost colorless crystals of m. p. 144° C.

Example 3

The solution obtained by diazotizing 127.5 parts of o-chloro-aniline in the usual way is added to a solution of 153 parts of 2,5-dimethoxyaniline in 370 parts of 10% aqueous hydrocholoric acid and 600 parts of water at 10° C. When combination is complete the aminoazo compound obtained is diazotized by the addition of 72 parts of sodium nitrite, the mixture being stirred at 10° C. until diazotization is complete. The diazo-azo compound remains in solution.

This solution is then added to a solution of 203 parts of 1,β - hydroxyethylamino - 5 - naphthol (prepared as in Example 1) in 370 parts of 10% hydrochloric acid and 8000 parts of water. The insoluble dyestuff is precipitated. The suspension is made faintly alkaline by adding sodium carbonate and the dyestuff is filtered off, washed with water, and preserved as paste or it may be dried in any suitable way. The dyestuff has the formula:

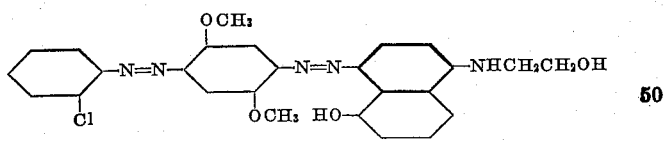

It dyes cellulose acetate in clear blue shades, when applied, for example, in the manner described in United States Patent Specification No. 1,534,019.

Example 4

107 parts of o-toluidine are diazotized in the usual way and to the solution so obtained is added sufficient sodium acetate to remove the mineral acidity.

The solution is then added to a solution of 153 parts of 2,5-dimethoxyaniline in 370 parts of 10% aqueous hydrochloric acid and 6000 parts of water at 10° C. When combination is complete 370 parts of 10% hydrochloric acid are added and the amino-azo compound is diazotized by the addition of 72 parts of sodium nitrite, the mixture being stirred at 10° C. until diazotization is complete. The diazo-azo compound remains in solution.

This solution is then added to a solution of 203 parts of 1,β-hydroxyethylamino-5-naphthol in 370 parts of 10% hydrochloric acid and 8000 parts of water. When combination is complete the dyestuff is isolated as in Example 3. It has the formula:

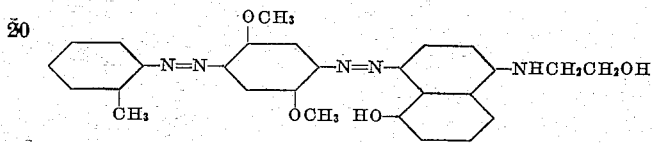

and dyes cellulose acetate in reddish-blue shades when applied in the manner described in Example 3.

Example 5

143 parts of α-naphthylamine are diazotized in the known way and the solution so obtained added to a solution of 153 parts of 2,5-dimethoxy-aniline in 370 parts of 10% aqueous hydrochloric acid and 6000 parts of water at 10° C. After stirring at 5°–10° C. for an hour the coupling is completed by the careful addition during half an hour of a solution of 230 parts of sodium acetate in 1000 parts of water. When combination is complete 555 parts of 10% hydrochloric acid are added followed by 72 parts of sodium nitrite. After stirring at 5°–10° C. for 4 hours diazotization of the aminoazo compound is complete and the diazo-azo compound, which is mostly out of solution, is added to a solution of 203 parts of 1,β-hydroxy-ethylamino-5-naphthol in 370 parts of 10% hydrochloric acid and 8000 parts of water at 15° C. The mixture is stirred until combination is complete when the dyestuff suspension is rendered slightly alkaline by the addition of sodium carbonate, the dyestuff filtered off, washed with water, and preserved as a paste or it may be dried in any suitable way. It has the formula:

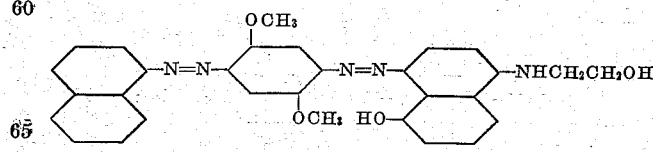

and dyes cellulose acetate in greenish-black shades when applied in the manner described in Example 3.

Example 6

The solution obtained by diazotizing 137 parts of p-phenetidine is added to a solution of 181 parts of 2,5-diethoxyaniline in 370 parts of 10% hydrochloric acid and 6000 parts of water at 10° C. After stirring at 5°–10° C. for an hour the coupling is completed by the careful addition during half an hour of a solution of 230 parts of sodium acetate in 1400 parts of water. When combination is complete 555 parts of 10% hydrochloric acid are added followed by 72 parts of sodium nitrite. After stirring at 5°–10° C. for 4 hours diazotization of the aminoazo compound is complete, and the solution of diazoazo compound is added to a solution of 203 parts of 1,β-hydroxyethylamino-5-naphthol in 370 parts of 10% hydrochloric acid and 8000 parts of water at 15° C.

The mixture is stirred until combination is complete when the dyestuff, which is out of solution, is isolated as in Example 5. It has the formula:

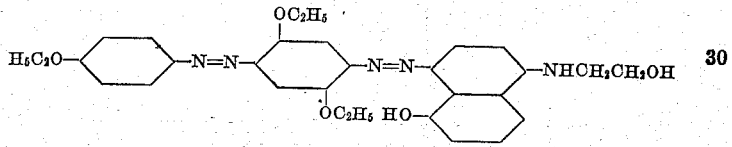

and dyes cellulose acetate in greenish-black shades.

Example 7

The solution obtained by diazotizing 93 parts of aniline in the usual way is added to a solution of 153 parts of 2,5-dimethoxy-aniline in 370 parts of 10% aqueous hydrochloric acid and 6000 parts of water at 10° C. Combination is facilitated by the cautious addition of an aqueous solution of sodium acetate so as to reduce the mineral acidity of the coupling medium to a minimum. When combination is complete 480 parts of 10% aqueous hydrochloric acid are added and the monoazo suspension is heated to 35–40° C. 72 parts of sodium nitrite are then added and the mixture stirred until diazotization is complete, the diazo-azo compound being in solution. The mixture is then filtered if necessary, the filtrate cooled to 15° C. and then added to a solution of 203 parts of 1,β-hydroxyethylamino-5-naphthol in 370 parts of 10% aqueous hydrochloric acid and 8000 parts of water at 15° C. The resulting mixture is stirred until combination is complete, the dyestuff being precipitated. The dyestuff suspension is then rendered faintly alkaline with sodium carbonate, and the dyestuff is filtered off, washed with water, and preserved as paste or dried in any suitable way. It has the formula:

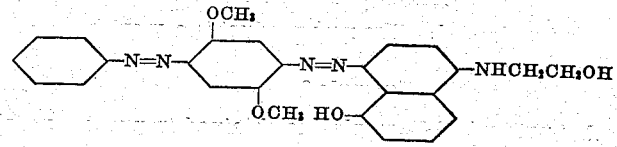

Example 8

Sixty-nine (69) parts of sodium nitrite are added to 1480 parts of 100% sulphuric acid and stirred until no solid remains, then 222 parts of 6-chloro-2,4-dinitroaniline are added to this with stirring during 2 hours and stirring continued for a short time longer if necessary, until no solid matter remains. The resulting liquid is added slowly to a solution of 203 parts of 1,β-hydroxyethylamino-5-naphthol in 370 parts of 10% aqueous hydrochloric acid and 4000 parts of water at 0–5° C., ice being added from time to time to keep the temperature at 0–5° C. When all the liquid has been added and combination is complete the mineral acidity of the resulting dyestuff suspension is almost completely removed by the cautious addition of a solution of 1040 parts of caustic soda in 2600 parts of water. The mixture is then made faintly alkaline by the addition of sodium carbonate. The dyestuff is filtered off, washed with water and preserved as paste or dried in any suitable way. It has the formula:

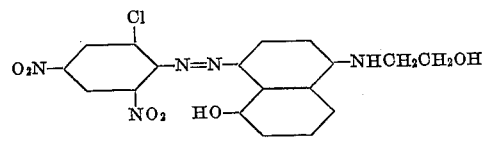

and dyes cellulose acetate in clear greenish-blue shades when applied in the manner described in Example 3. The use of 6-bromo-2,4-dinitroaniline instead of 6-chloro-2,4-dinitroaniline results in a dyestuff producing similar shades on cellulose acetate.

I claim:

1. Process for the manufacture of azo dyes which comprises coupling 1,β-hydroxyethylamino-5-naphthol with an aromatic diazo-compound.
2. Process for the manufacture of azo dyes which comprises coupling 1,β-hydroxyethylamino-5-naphthol with an aromatic diazo compound in acid medium.
3. Process for the manufacture of azo dyes which comprises coupling 1,β-hydroxyethylamino-5-naphthol with an aromatic diazoazo compound.
4. Process for the manufacture of azo dyes which comprises coupling 1,β-hydroxyethylamino-5-naphthol with a diazoazo compound obtained by diazotizing an aminoazo compound of formula:

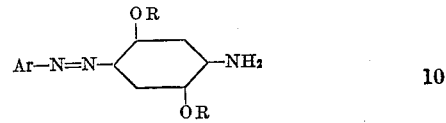

in which R stands for alkyl, and Ar stands for an aryl group of the benzene or naphthalene series.

5. Process as claimed in claim 4 in which R stands for methyl.
6. Process as claimed in claim 4 in which R stands for ethyl.
7. Process as claimed in claim 4 in which Ar stands for a chlorophenyl group and R stands for an alkyl having not more than 2 carbon atoms.
8. As new compositions of matter azo dyes containing as end component 1-β-hydroxyethylamino-5-naphthol, said end component being coupled to an aromatic diazo radical.
9. As new compositions of matter, disazo dyes of the formula:

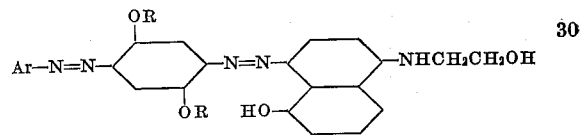

in which Ar and R have the same significance as in claim 4.

10. As a new composition of matter, a disazo dye of the formula:

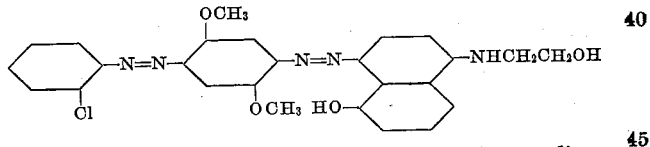

11. As a new composition of matter, a disazo dye of the formula:

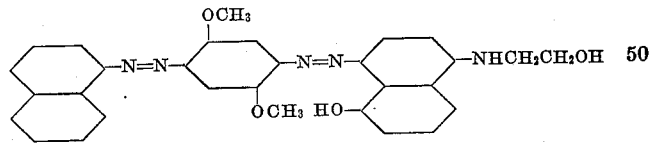

12. Process as in claim 4, in which Ar stands for a tolyl group and R stands for methyl.
13. As a new composition of matter, a disazo dye of the formula

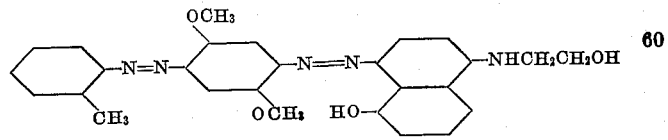

ARTHUR HOWARD KNIGHT.